(12) United States Patent
Jang et al.

(10) Patent No.: US 11,762,167 B2
(45) Date of Patent: Sep. 19, 2023

(54) CAMERA MODULE

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Nam Ki Park, Suwon-si (KR); Young Bok Yoon, Suwon-si (KR); Hee Soo Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 218 days.

(21) Appl. No.: 17/075,896

(22) Filed: Oct. 21, 2020

(65) Prior Publication Data

US 2021/0263260 A1  Aug. 26, 2021

(30) Foreign Application Priority Data

Feb. 24, 2020 (KR) .................. 10-2020-0022521

(51) Int. Cl.
*G02B 7/04* (2021.01)
*G02B 27/64* (2006.01)
(Continued)

(52) U.S. Cl.
CPC ............. *G02B 7/04* (2013.01); *G02B 27/646* (2013.01); *G03B 5/02* (2013.01); *G03B 13/34* (2013.01); *H04N 23/55* (2023.01); *H04N 23/687* (2023.01)

(58) Field of Classification Search
CPC ........... G02B 7/04; G02B 27/646; G03B 5/02
See application file for complete search history.

(56) References Cited

U.S. PATENT DOCUMENTS 9,086,613 B1 * 7/2015 Baik ................. G03B 13/36
9,832,383 B2   11/2017 Hwang et al.
(Continued)

FOREIGN PATENT DOCUMENTS

CN     105278072 A    1/2016
CN     108027494 A    5/2018
(Continued)

OTHER PUBLICATIONS

Korean Office Action dated Jan. 11, 2021 in counterpart Korean Patent Application No. 10-2020-0022521. (7 pages in English)(5 pages in Korean).
(Continued)

*Primary Examiner* — Minh Q Phan
(74) *Attorney, Agent, or Firm* — NSIP Law

(57) ABSTRACT

A camera module includes a fixed portion, a movable portion configured to be moved relative to the fixed portion in an optical axis direction, at least two position detection sensors, and a magnet disposed to oppose the at least two position detection sensors in a direction intersecting the optical axis direction. The magnet includes an N-pole and an S-pole on a surface opposing the at least two position detection sensors and a neutral zone between the N-pole and the S-pole. The at least two position detection sensors are disposed such that at least one position detection sensor opposes one of the N-pole and the S-pole and at least one other positon detection sensor opposes the neutral zone when the movable portion is moved in the optical axis direction.

20 Claims, 12 Drawing Sheets

(51) Int. Cl.
    *G03B 13/34*    (2021.01)
    *G03B 5/02*     (2021.01)
    *H04N 23/55*   (2023.01)
    *H04N 23/68*   (2023.01)

(56) References Cited

U.S. PATENT DOCUMENTS

| | | |
|---|---|---|
| 2013/0163085 A1 | 6/2013 | Lim et al. |
| 2015/0050013 A1 | 2/2015 | Cadugan et al. |
| 2015/0346453 A1 | 12/2015 | Cheong et al. |
| 2016/0241787 A1 | 8/2016 | Sekimoto |
| 2016/0342069 A1 | 11/2016 | Inoue |
| 2017/0082823 A1 | 3/2017 | Hwang et al. |
| 2017/0356986 A1* | 12/2017 | Iwazawa ................. G01S 17/06 |
| 2018/0364450 A1 | 12/2018 | Lee et al. |
| 2021/0382263 A1 | 12/2021 | Lee et al. |

FOREIGN PATENT DOCUMENTS

| | | |
|---|---|---|
| CN | 109151263 A | 1/2019 |
| KR | 10-2013-0072721 A | 7/2013 |
| KR | 10-2015-0020950 A | 2/2015 |
| KR | 10-2015-0106793 A | 9/2015 |
| KR | 10-2019-0036372 A | 4/2019 |
| WO | WO 2015/026064 A1 | 2/2015 |
| WO | WO 2019/231245 A1 | 12/2019 |

OTHER PUBLICATIONS

First Examination Report dated Dec. 6, 2021 in counterpart Indian Patent Application No. 202014046831 (6 pages in English).
Chinese Office Action dated Aug. 11, 2022, in counterpart Chinese Patent Application No. 202110068498.5 (10 Pages in English, 11 Pages in Chinese).

* cited by examiner

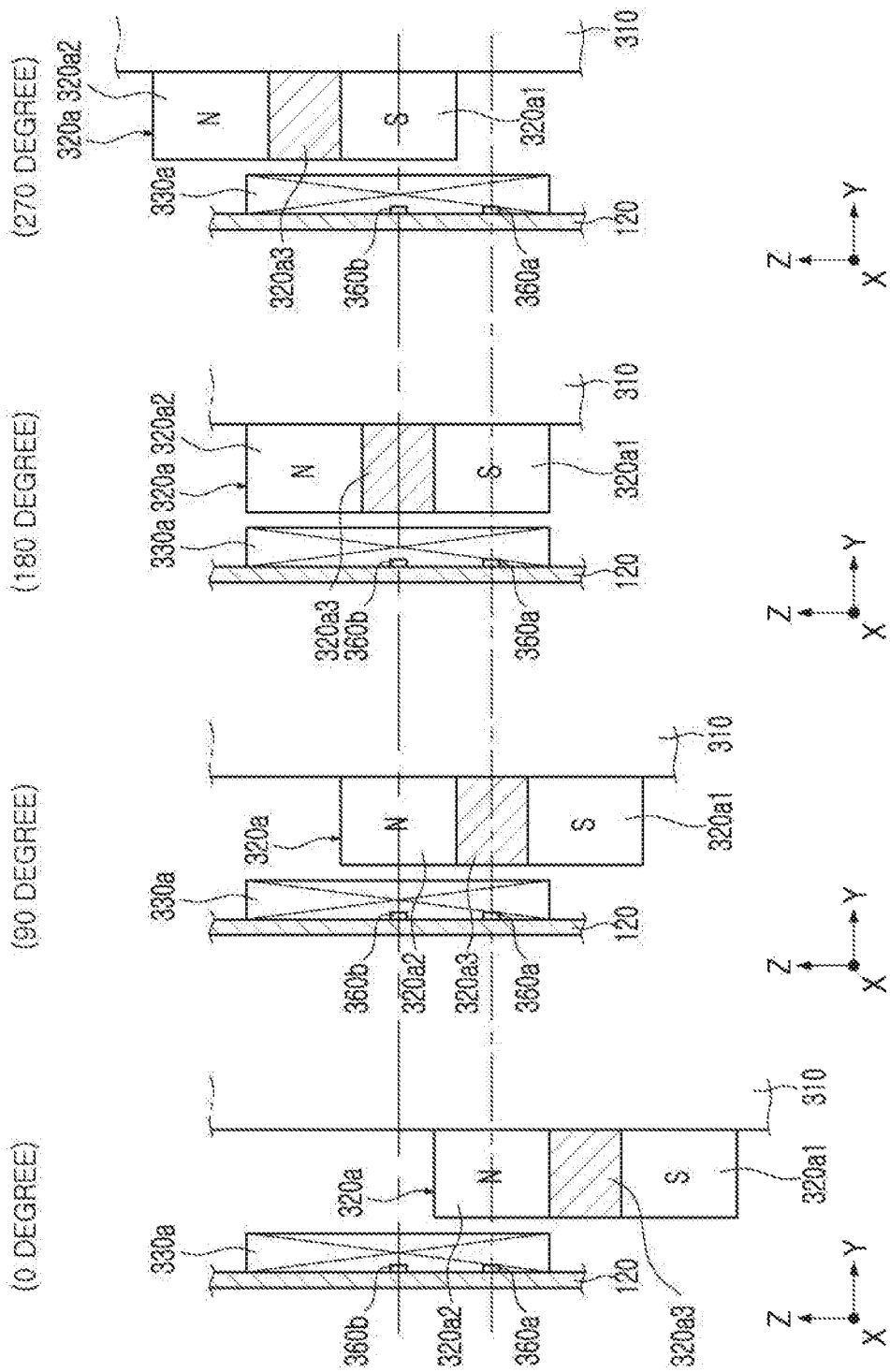

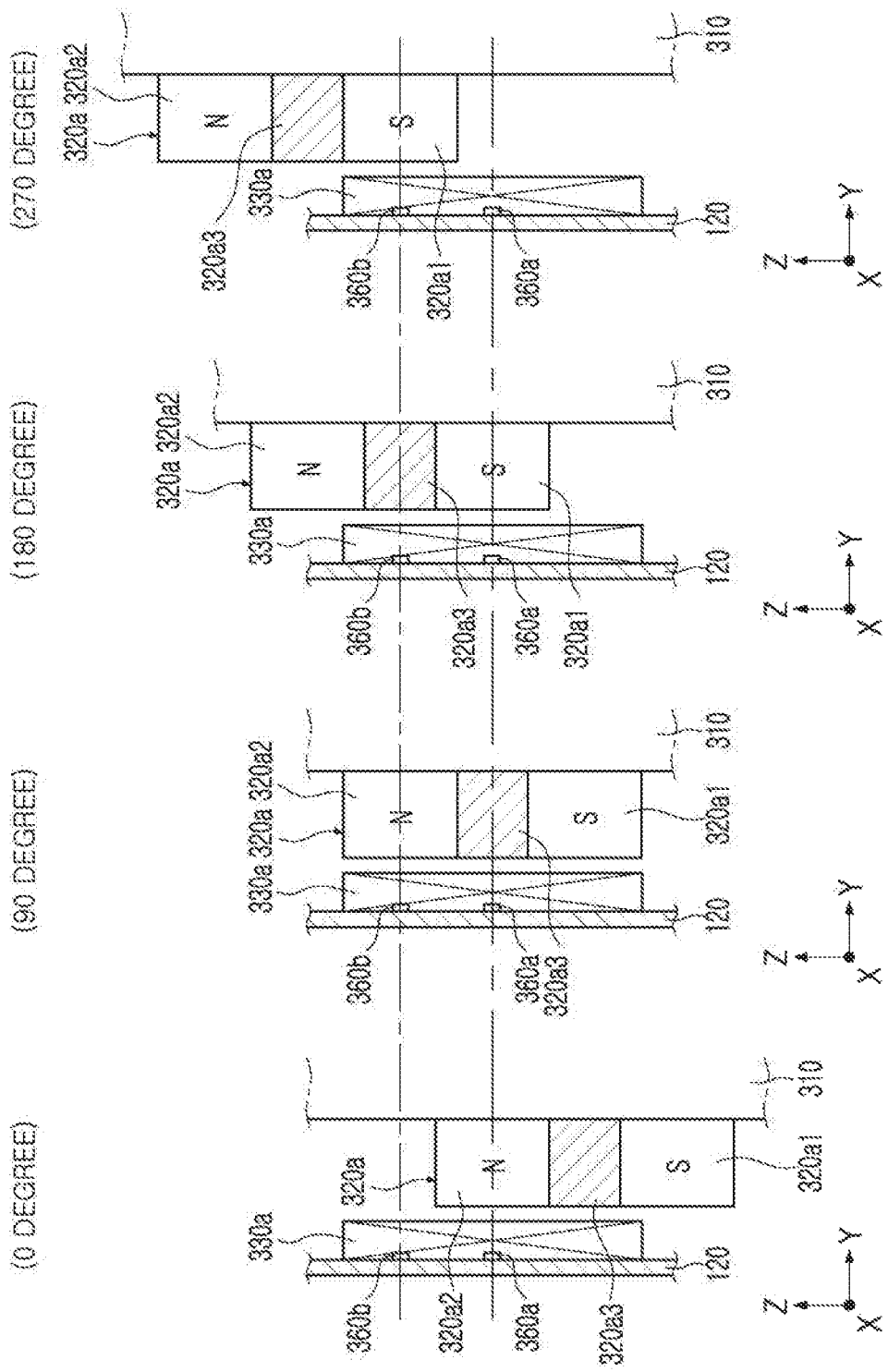

CAMERA MODULE

CROSS-REFERENCE TO RELATED APPLICATION(S)

This application claims the benefit under 35 USC 119(a) of Korean Patent Application No. 10-2020-0022521 filed on Feb. 24, 2020 in the Korean Intellectual Property Office, the entire disclosure of which is incorporated herein by reference for all purposes.

BACKGROUND

1. Field

This application relates to a camera module.

2. Description of Related Art

Recently, camera modules have been generally installed in portable electronic devices such as tablet personal computers (PCs), laptop computers, and the like, in addition to smartphones, and an autofocusing function, an optical image stabilization (OIS) function, a zoom function, and the like, have been added to camera modules for mobile terminals.

However, to implement various functions, structures of camera modules have become complicated and sizes of the camera modules have been increased. As a result, sizes of portable electronic devices, in which camera modules are mounted, have been increased.

In addition, to improve a zoom function, a camera module included in a mobile terminal includes a folded module refracting light using a reflection member. Light, reflected by the reflection member, may be incident on a lens module including a plurality of lenses. In such a case, the amount of movement of the lens module in an optical axis direction may be significantly increased.

Of course, such an increase in the amount of movement of the lens module in the optical axis direction is required in not only a case in which a folded module is provided according to user demand for high performance, but also a case of a camera module having a conventional structure in which light is directly incident without an additional reflection member.

In this regard, the amount of movement of a lens barrel in an optical axis direction has been significantly increased in recent years. Accordingly, there is need for a technology to accurately sense a position of a lens barrel in an optical axis direction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a camera module, capable of more accurately detecting a position of a lens barrel in an optical axis direction with a simple structural change.

In one general aspect, a camera module includes a fixed portion, a movable portion configured to be moved relative to the fixed portion in an optical axis direction, at least two position detection sensors, and a magnet disposed to oppose the at least two position detection sensors in a direction intersecting the optical axis direction. The magnet includes an N-pole and an S-pole on a surface opposing the at least two position detection sensors and a neutral zone between the N-pole and the S-pole. The at least two position detection sensors are disposed such that at least one position detection sensor opposes one of the N-pole and the S-pole and at least one other positon detection sensor opposes the neutral zone when the movable portion is moved in the optical axis direction.

The at least two position detection sensors may include a first position detection sensor and a second position detection sensor, and a distance between a center of the first position detection sensor and a center of the second position detection sensor in the optical axis direction may be substantially the same as a distance between a center of the N-pole or the S-pole of the magnet and a center of the neutral zone of the magnet.

The at least two position detection sensors may include a first position detection sensor and a second position detection sensor, and sensing values of the first position detection sensor and the second position detection sensor may have a sine or cosine curve when the movable portion is moved in the optical axis direction.

The sensing values of the first position detection sensor and the second position detection sensor may have a phase difference of about 90 degrees when the movable portion is moved in the optical axis direction.

The at least two position detection sensors may include a first position detection sensor and a second position detection sensor, and a value of arctan(H2/H1) may be increased or decreased in at least one period of a moving range of the movable portion, where H1 and H2 are sensing values of the first position detection sensor and the second position detection sensor, respectively.

The value of arctan(H2/H1) may be constantly increased or decreased in the at least one period of the moving range of the movable portion.

A distance from a center of the neutral zone of the magnet to a center of the N-pole of the magnet in the optical axis direction and a distance from the center of the neutral zone of the magnet to a center of the S-pole of the magnet in the optical axis direction may be substantially the same.

A length of the N-pole of the magnet in the optical axis direction and a length of the S-pole of the magnet in the optical axis direction may be the same.

The at least two position detection sensors may include a first position detection sensor and a second position detection sensor disposed adjacent to each other, and one of the first and second position detection sensors may be disposed in substantially a same position as a center of a coil in the optical axis direction.

The other of the first and second position detection sensors may be spaced apart from a portion above or below the center of the coil at a certain interval in the optical axis direction.

The at least two position detection sensors may include a first position detection sensor and a second position detection sensor disposed adjacent to a coil, and the magnet may be disposed to oppose the coil in the direction intersecting the optical axis direction.

Only one of the at least two position detection sensors may oppose one of the N-pole and the S-pole when the movable portion is moved in the optical axis direction.

Only one of the at least two position detection sensors may oppose one of the N-pole and the S-pole when the movable portion is disposed in an uppermost or lowermost portion in the optical axis direction.

The N-pole or the S-pole, not opposing the position detection sensor, may oppose air when each of the at least one position detection sensor and the at least one other position detection sensor are disposed in a position opposing both a center of one of the N-pole and the S-pole and a center of the neutral zone.

The magnet may be disposed on the movable portion and the at least two position detection sensors may be disposed on the fixed portion.

The magnet may be disposed on the fixed portion and the at least two position detection sensors may be disposed on the movable portion.

In another general aspect, a camera module includes a housing and a movable portion moved relatively to the housing in an optical axis direction. One of the housing and the movable portion includes a coil and the other of the housing and the movable portion includes a magnet that opposes the coil in a direction intersecting the optical axis direction. The magnet has an N-pole and an S-pole on a surface opposing the coil in the optical axis direction and has a neutral zone between the N-pole and the S-pole, at least two position detection sensors are disposed in different positions in the optical axis direction to oppose the magnet, and a distance between centers of two adjacent position detection sensors, among the at least two position detection sensors, is substantially the same as a distance between a center of the N-pole or the S-pole of the magnet and a center of the neutral zone of the magnet.

The at least two position detection sensors may be disposed to have a same interval in the optical axis direction.

In another general aspect, a camera module includes a fixed portion; a movable portion configured to be moved relative to the fixed portion in an optical axis direction; a first position detection sensor; a second position detection sensor spaced apart from the first sensor along the optical axis direction; and a magnet disposed to oppose the first and second position detection sensors along a direction intersecting the optical axis direction. The magnet includes an N-pole and an S-pole that oppose each other along the optical axis direction with a neutral zone disposed therebetween. During movement of the movable portion relative to the fixed portion, the first and second position detection sensors are disposed such that one of the first and second position detection sensors is disposed opposite one of the N-pole and an S-pole and the other of the first and second position detection sensors is disposed opposite the neutral zone or is unopposed by any portion of the magnet.

The camera module may further include a coil configured to electromagnetically interact with the magnet to move the movable portion relative to the fixed portion in an optical axis direction, and the coil and the first and second position detection sensors may be disposed together on one of the movable portion and the fixed portion, and the magnet may be disposed on the other one of the movable portion and the fixed portion.

Other features and aspects will be apparent from the following detailed description, the drawings, and the claims.

BRIEF DESCRIPTION OF DRAWINGS

FIGS. 7A, 7B, 7C, and 7D are reference diagrams illustrating a changes in the positional relationship between the position detection sensor and the magnet, illustrated in FIG. 6A, when a movable portion is moved in an optical axis direction.

FIGS. 8A, 8B, 8C, and 8D are reference diagrams illustrating a changes in the positional relationship between the position detection sensor and the magnet, illustrated in FIG. 6B, when a movable portion is moved in an optical axis direction.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
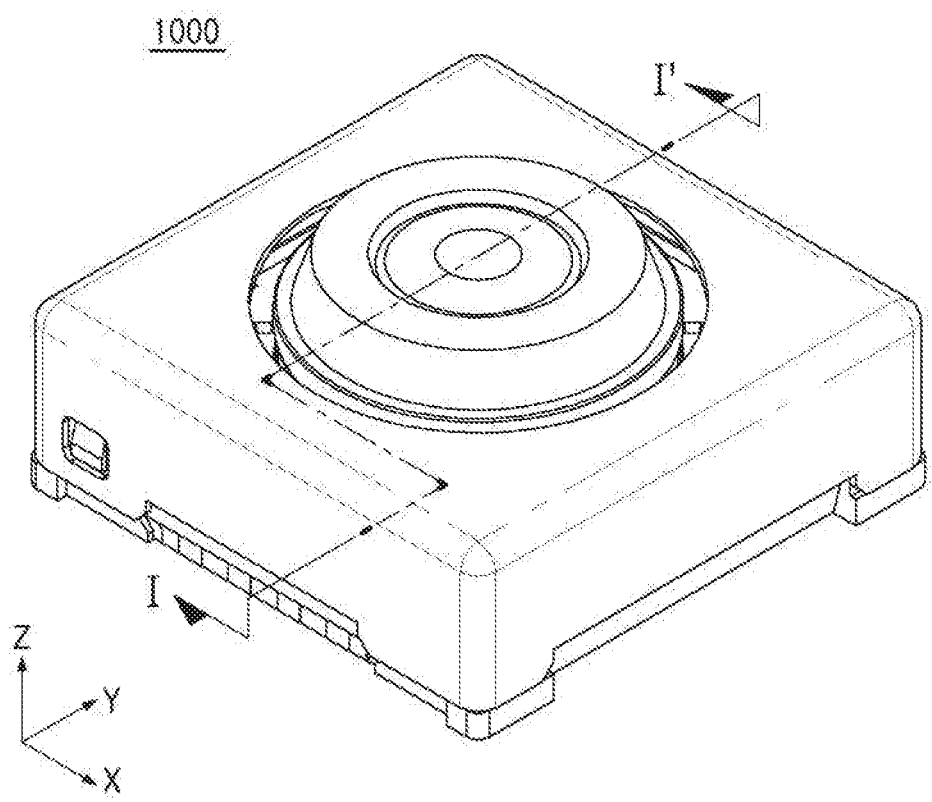
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, while examples of the present disclosure will be described in detail with reference to the accompanying drawings, it is noted that examples are not limited to the same.

The present disclosure relates to a camera module, and may be applied to portable electronic devices such as mobile communications terminals, smartphones, tablet PCs, and the like.

A camera module is an optical device for capturing still or moving images. A camera module may include a lens, refracting light reflected from a subject, and a lens driving device moving the lens to adjust a focus or to compensate for the shaking of the camera module while images are captured.

Figure 2:
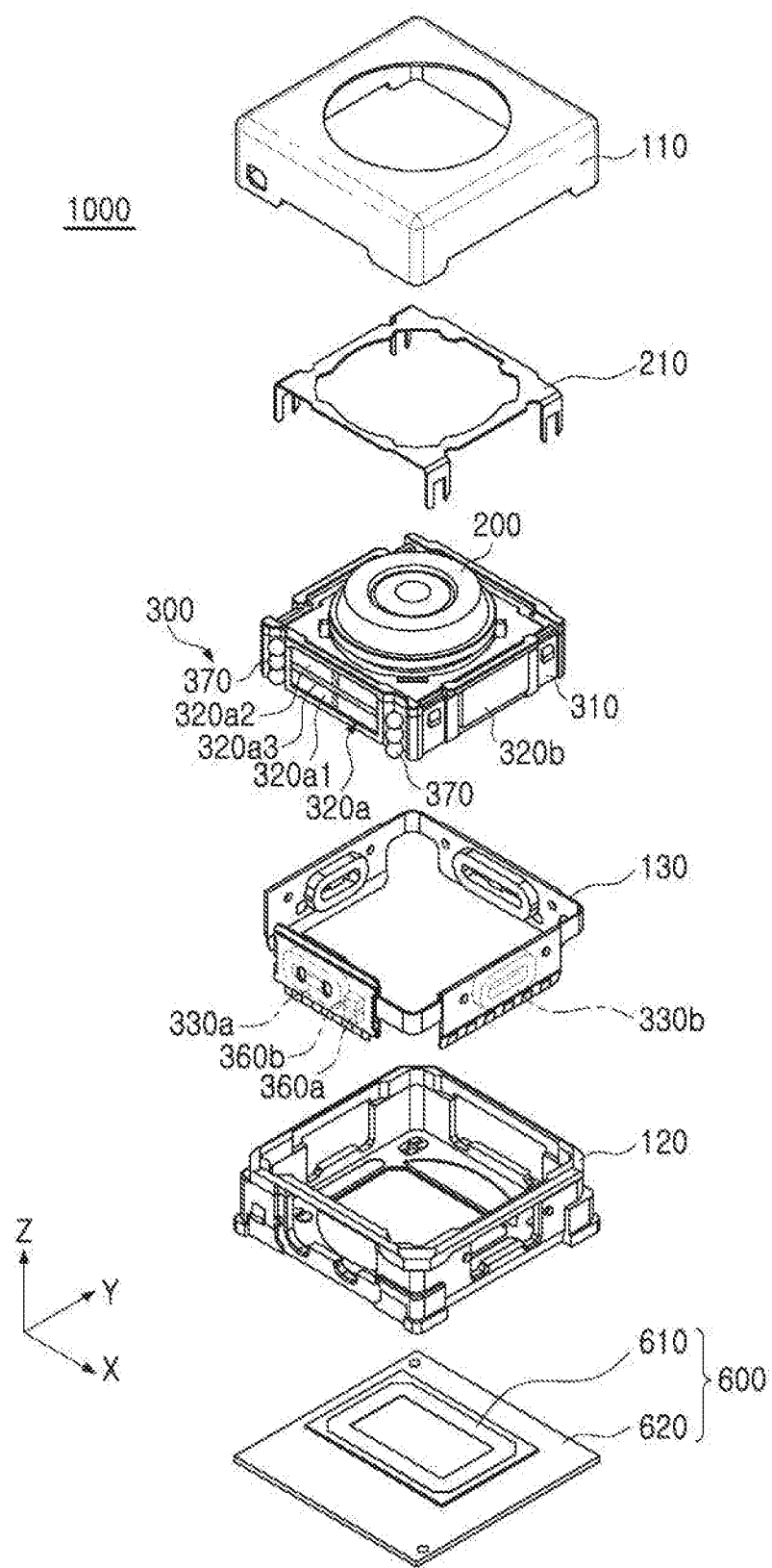
FIG. 2 is an exploded perspective view of a camera module according to an example.

FIG. 1 is a perspective view of a camera module according to an example, and FIG. 2 is an exploded perspective view of a camera module according to an example.

Referring to FIGS. 1 and 2, a camera module 1000 according to an example includes a lens barrel 200, a lens driving device 300 moving the lens barrel 200, an image sensor unit 600 converting light, incident through the lens barrel 200, into an electrical signal, and a housing 120 and a case 110 accommodating the lens barrel 200 and the lens driving device 300.

The lens barrel 200 may have a hollow cylindrical shape to accommodate a plurality of lenses, capturing a subject, therein. The plurality of lenses is mounted in the lens barrel 200 along an optical axis.

The plurality of lenses may be disposed as many as necessary depending on a design of the lens barrel 200 and may have the same or different optical characteristics, such as a refractive index and the like.

The lens driving device 300 is a device moving the lens barrel 200.

As an example, the lens driving device 300 may move the lens barrel 200 in an optical axis direction (a Z-axis direction) to adjust a focus or to perform a zoom function. In addition, the lens driving device 300 may move the lens barrel 200 in a direction perpendicular to the optical axis direction (the Z-axis direction), to compensate for shaking during image capturing.

The image sensor unit 600 is a device converting light, incident through the lens barrel 200, into an electrical signal.

As an example, the image sensor unit 600 may include an image sensor 610 and a printed circuit board 620 connected to the image sensor 610 and may further include a filter, in detail, an infrared filter.

The filter may block light in a specific region, in the light incident through the lens barrel 200. For example, the infrared filter may serve to block light in an infrared region.

The image sensor 610 converts light, incident through the lens barrel 200, into an electrical signal. For example, the image sensor 610 may be a charge-coupled Device (CCD) or a complementary metal-oxide Semiconductor (CMOS).

The electrical signal, converted by the image sensor 610, is output as an image through a display unit of a portable electronic device.

The lens barrel 200 and the lens driving device 300 are accommodated in the housing 120.

As an example, the housing 120 has a shape with an open top and bottom, and the lens barrel 200 and the lens driving device 300 may be accommodated in an internal space of the housing 120. The image sensor unit 600 is disposed below the housing 120. A holder 210 may be disposed between the case 110 and the lens driving device.

The case 110 is coupled to the housing 120 to surround an external surface of the housing 120, and serves to protect internal components of the camera module 1000. The case 110 may serve to shield electromagnetic waves.

Since a portable electronic device is equipped with various electronic components other than the camera module 1000, the case 110 may shield electromagnetic waves generated by such electronic components such that the electromagnetic waves do not affect the camera module 1000.

The case 110 may be formed of a metal to be grounded to a grounding pad provided on the printed circuit board 620 to shield electromagnetic waves.

Figure 3:
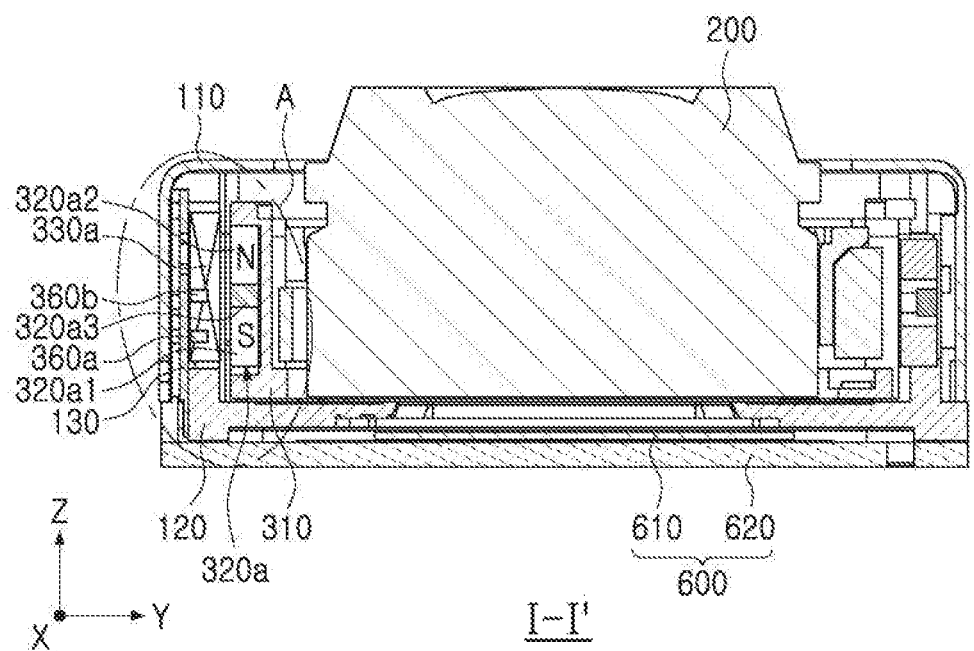
FIG. 3 is a cross-sectional view taken along line I-I' in FIG. 1.
Figure 4:
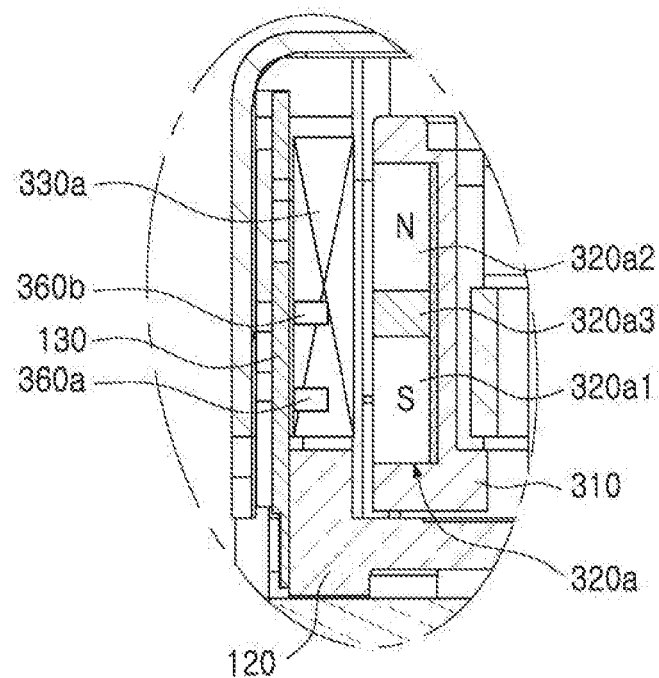
FIG. 4 is a schematic enlarged view of portion A of FIG. 3.
Figure 5:
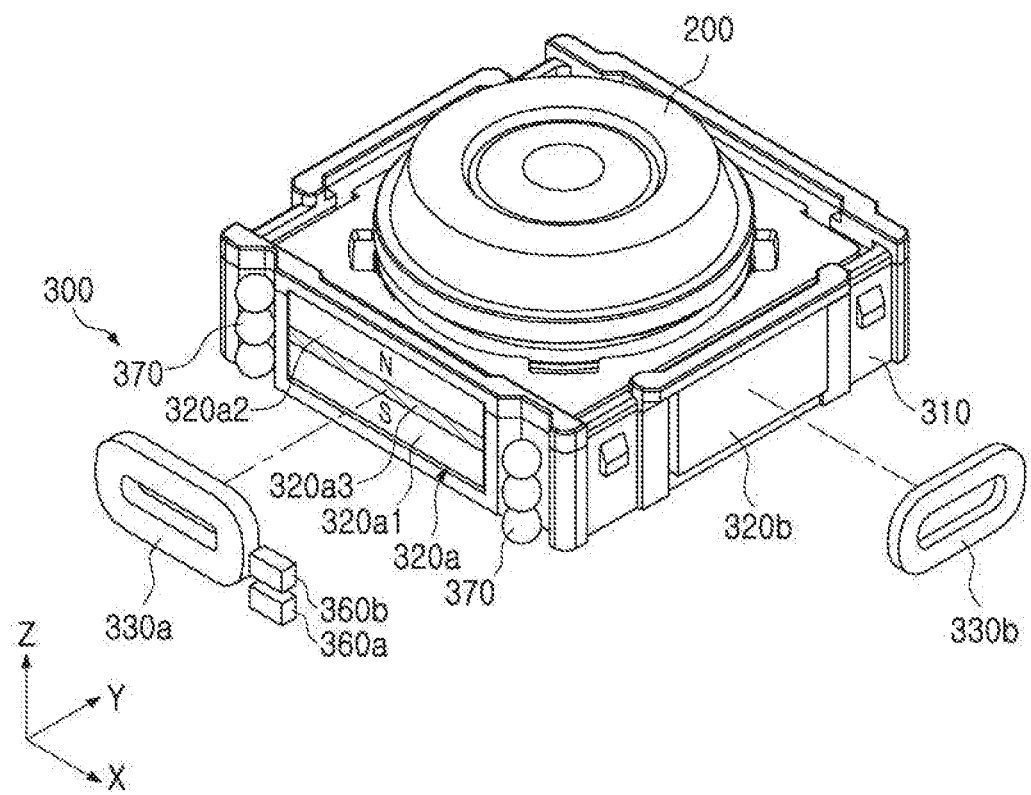
FIG. 5 is a partially exploded perspective view of a camera module according to an example.

FIG. 3 is a cross-sectional view taken along line I-I' in FIG. 1, FIG. 4 is a schematic enlarged view of portion A of FIG. 3, and FIG. 5 is a partially exploded perspective view of a camera module according to an example of the present disclosure.

Referring to FIGS. 2 to 5, an adjustment unit (a focusing function or a zoom function) of the lens driving device 300 according to an example will be described.

The lens driving device 300 according to an example moves the lens barrel 200 to focus on a subject or to perform a zoom function.

As an example, lens driving device 300 may be provided to move the lens barrel 200 in an optical axis direction (a Z-axis direction). The lens barrel 200 may accommodate a shake (hand-shake) correction unit therein, or the lens barrel 200 may be accommodated in a shake (hand-shake) correction unit.

The lens driving device 300 includes a carrier 310, receiving the lens barrel 200, and a driving portion generating driving force to move the carrier 310 and the lens barrel 200 in the optical axis direction (the Z-axis direction).

The driving portion includes a magnet 320a and a coil 330a. The magnet 320a and the coil 330a may be selectively provided in a fixing portion and a movable portion, respectively. The fixing portion may include members of the lens driving device 300, not moved in the optical axis direction, such as the housing 120, a substrate 130, and the like. The movable portion may include all members, moved in the optical axis direction, such as the lens barrel 200, the carrier 310, and the like. Hereinafter, for ease of description, a description will be given of a structure in which the magnet 320a is provided in the movable portion and the coil 330a is provided in the fixing portion.

The magnet 320a is mounted on the carrier 310. For example, the magnet 320a may be mounted on one surface of the carrier 310. The magnet 320a has at least an N-pole 320a2 and an S-pole 320a1 in the optical axis direction, and may have a neutral zone 320a3 between the N-pole and the S-pole.

The magnet 320a may be polarized such that a single magnet has an N-pole and an S-pole in the optical axis direction, and a neutral zone may be provided between the N-pole and the S-pole. In this case, the neutral zone is formed between the N-pole and the S-pole in the optical axis direction. For example, the neutral zone may be formed to occupy about 5% of an overall length of the magnet 320a in a direction, vertical to the optical axis, in a center of a physical length obtained by dividing the overall length of the magnet 320a in half, and thus, may occupy 10% or less of the overall length of the magnet 320a. In addition, since the lengths of the N-pole and the S-pole in the optical axis direction are a length excluding the neutral zone from the overall length of the magnet 320a, each of the lengths of the N-pole and the S-pole in the optical axis direction may occupy 45% or more of the overall length of the magnet 320a.

The magnet 320a may be provided with two magnets. In this case, the two magnets are aligned in the optical axis direction. The two magnets may be disposed in the optical axis direction such that an N-pole of one of the two magnets and an S-pole of the other magnet oppose two position detection sensors 360a and 360b. In addition, a neutral zone may be provided between the two magnets. The neutral zone is a portion in which a magnetic field is not formed because additional polarization, or the like, does not occur, and may be formed of various materials.

The coil 330a is mounted in the housing 120. For example, the coil 330a may be mounted in the housing 120 by way of the substrate 130. In FIG. 2, the coil 330a may be fixed to the substrate 130 and a coil of a shake correction unit, not illustrated, may be provided on the other surface of the substrate 130.

In addition, the two position detection sensors 360a and 360b may be disposed to be adjacent to the coil 330a and may be provided to be spaced apart from the fixing portion at regular intervals in the optical axis direction. The position detection sensors 360a and 360b are provided to oppose the magnet 320a to detect a movement of the magnet 320a. The magnet 320a, used for sensing of the position sensing sensors 360a and 360b, may be a driving magnet supplying power to the movement of the carrier 310 or an independently provided sensing magnet.

The magnet 320a is a movable member mounted on the carrier 310 to move in the optical axis direction (the Z-axis direction) together with the carrier 310, and the coil 330a is a fixed member fixed to the housing 120. However, the configuration is not limited thereto, and positions of the magnet 320a and the coil 330a are interchangeable with each other. When the positions are interchanged, the above-described position detection sensors 360a and 360b may also move to the movable portion along the coil 330a.

When power is applied to the coil 330a, the carrier 310 may be moved in the optical axis direction (the Z-axis direction) by electromagnetic interaction between the magnet 320a and the coil 330a.

Since the lens barrel 200 is accommodated in the carrier 310, the lens barrel 200 is also moved in the optical axis direction (the Z-axis direction) by the movement of the carrier 310.

When the carrier 310 is moved, a rolling member 370 is disposed between the carrier 310 and the housing 120 to reduce friction between the carrier 310 and the housing 120. The rolling member 370 may have a ball shape. Rolling members 370 may be disposed on both sides of the magnet 320a.

A yoke may be disposed in the housing 120, and the carrier 310 may be closely supported on the housing 120 by attraction force between the yoke and the magnet 320a. In addition, the yoke may also serve to focus the magnetic force of the magnet 320a to prevent generation of leakage flux.

The example may use a control method of detecting and utilizing the position of the lens barrel 200. Accordingly, the camera module 1000 according to an example may include a control portion for detecting the position of the lens barrel 200 and utilizing the detected position for movement.

The at least two position detection sensors 360a and 360b may be provided to detect the position of the lens barrel 200. The position sensors 360a and 360b may be hall sensors.

The position detection sensors 360a and 360b may be disposed on the outside of the coil 330a to be spaced apart from each other at a predetermined interval in the optical axis direction, and may be mounted on the substrate 130 on which the coil 330a is mounted.

In addition, the position detection sensors 360a and 360b may be integrally formed with a circuit element providing a drive signal to the adjustment unit 300. However, the configuration is not limited thereto, and the position detection sensors 360a and 360b and the circuit element may be provided as independent components.

For example, when the camera module is powered on, an initial position of the lens barrel 200 may be detected by the position detection sensors 360a and 360b. Then, the lens barrel 200 is moved from the detected initial position to an initially set position. The term "initial position" may refer to a position in the optical axis direction of the lens barrel 200 when the camera module 1000 is powered on.

The lens barrel 200 may be moved from the initially set position to a target position by the drive signal of the circuit element.

During a focusing process, the lens barrel 200 may be moved forward and backward in the optical axis direction (the Z-axis) direction (for example, bi-directionally moved).

A magnet 320b and a coil 330b may be additionally provided to secure sufficient driving force during the focusing process.

When a magnet-mounted area is decreased with the trend for slimming of a camera module, a size of the magnet may be reduced, and thus, sufficient driving force required for focusing may not be secured.

However, in the present examples, the magnets 320a and 320b may be respectively attached to different surfaces of the carrier 310, and the coils 330a and 330b may be respectively provided to different surfaces of the housing 120 to respectively face the magnets 320a and 320b. Thus, sufficient driving force required for focusing may be secured even when a camera module is slimmed.

Figure 6A:
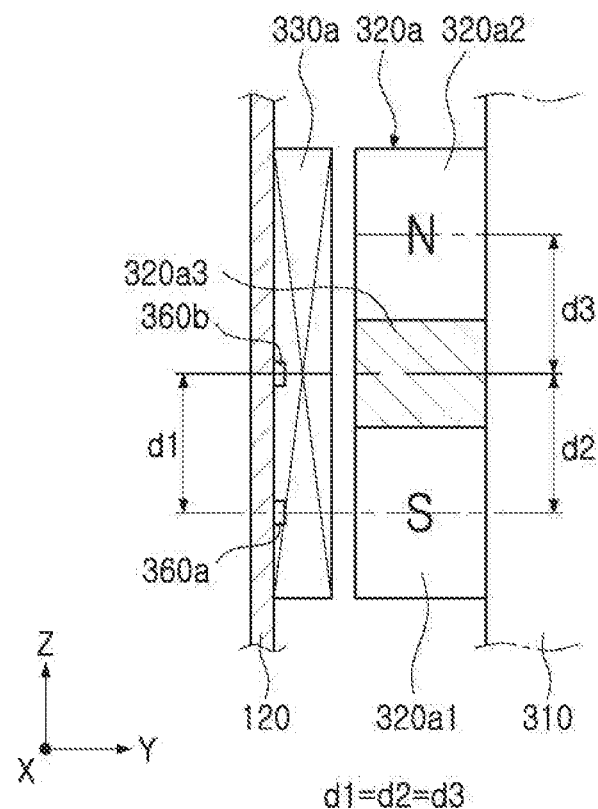
FIGS. 6A and 6B are reference diagrams illustrating a positional relationship between a position detection sensor and a magnet according to an example.
Figure 6B:
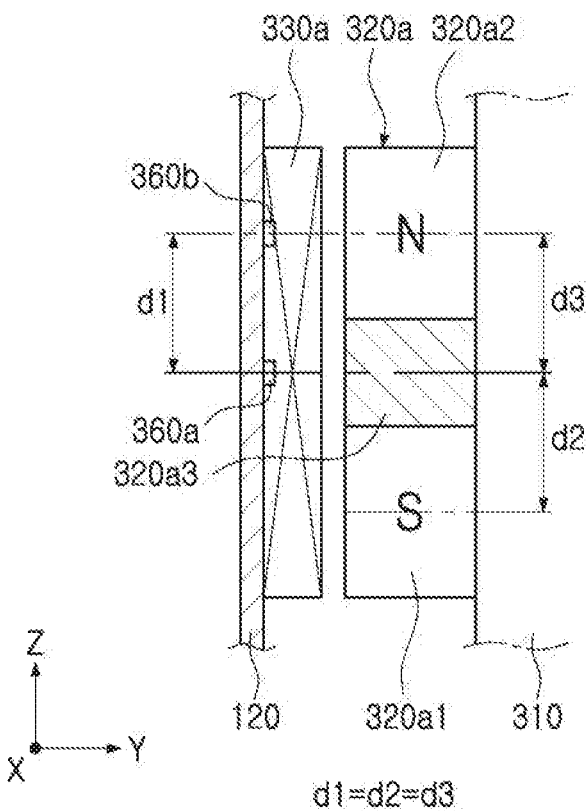

FIGS. 6A and 6B are reference diagrams illustrating a positional relationship between a position detection sensor and a magnet according to an example.

Referring to FIGS. 6A and 6B, a camera module according to an example includes a magnet 320a in a carrier 310, a movable portion, and includes two position detection sensors 360a and 360b in a housing 120, a fixed portion, by way of a substrate 130. Among the two position detection sensors 360a and 360b, a position detection sensor disposed below an optical axis direction will be referred to as a first position detection sensor 360a, and a position detection sensor disposed above the optical axis direction will be referred to as a second position detection sensor 360b.

The first and second position detection sensors 360a and 360b may be provided in different positions in the optical axis direction. One of the first and second position detection sensors 360a and 360b may be provided in a position corresponding to a center of a coil 330a in the optical axis direction, and the other may be provided to be spaced apart above or below a center of the coil 330a at a regular interval in the optical axis direction.

FIG. 6A illustrates a case in which the second position detection sensor 360b is provided in a position corresponding to the center of the coil 330a, and FIG. 6B illustrates a case in which the first position sensor 360a is provided in a position corresponding to the center of the coil 330a.

A distance d1 between the centers of the first and second position detection sensors 360a and 360b in the optical axis direction may be (substantially) the same as a distance d2 between a center of an S-pole 320a1 of the magnet 320a and a center of a neutral zone 320a3 of the magnet 320a in the optical axis direction, or a distance d3 between a center of an N-pole 320a2 of the magnet 320a and a center of the neutral zone 320a3 of the magnet 320a in the optical axis direction. Accordingly, a distance of the N-pole 320a2 of the magnetic 320a in the optical axis direction and a distance of the S-pole 320a1 of the magnet 320a in the optical axis direction may be the same.

In this case, a center of each portion of a magnet may refer to a center of a physical length obtained by dividing an overall length of each portion in the optical axis direction in half. For example, the center of the S-pole 320a1, the N-pole 320a2, or the neutral zone 320a3 may refer to a physical center, a position obtained by dividing an overall length of the S-pole 320a1, the N-pole 320a2, or the neutral zone 320a3 in the optical axis direction in half.

When the movable portion including the magnet 320a moves in the optical axis direction, each of the two position detection sensors 360a and 360b may be provided to have a position opposing both one of the N-pole 320a2 and the S-pole 320a1 of the magnet 320a and the neutral zone 320a3 of the magnet 320a. When each of two position detection sensors is disposed in a position opposing both a center of one of an N-pole and an S-pole and a center of the neutral zone, an N-pole or an S-pole, not opposing the position detection sensor, may oppose air.

Figure 9:
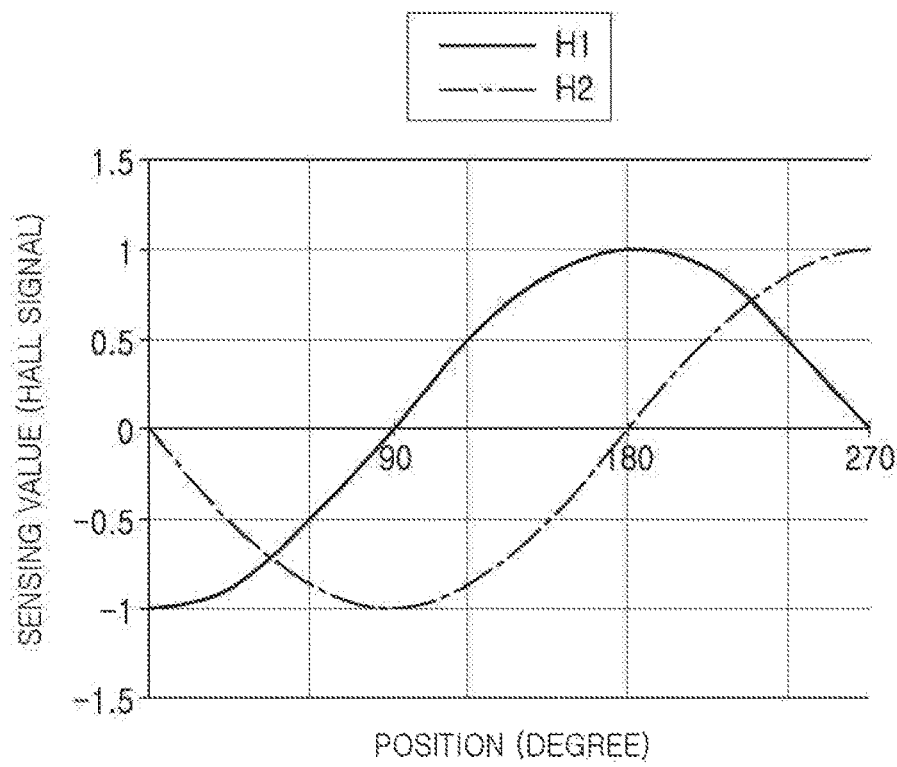
FIG. 9 is a graph illustrating sensing values of the position detection sensor when a movable portion is moved in an optical axis direction, in the positional relationship between the position detection sensor and the magnet illustrated in FIG. 6B.

FIGS. 7A to 7D and FIGS. 8A to 8D are reference diagrams illustrating a changes in the positional relationship between the position detection sensor and the magnet, illustrated in FIG. 6A, when a movable portion is moved in an optical axis direction. FIG. 9 is a graph illustrating sensing values of the position detection sensor when a movable portion is moved in an optical axis direction, in the positional relationship between the position detection sensor and the magnet illustrated in FIG. 6B.

When a movable portion 310 is moved in the optical axis direction Z, the first and second position detection sensors H1 and H2 (360a and 360b), for example, Hall sensors have different sensing values (unit: Tesla (T), for example) depending on a position of the magnet 320a. In this example, the first and second position sensors H1 and H2 may have a sine or cosine curve shape according to the movement of the magnet 320a.

Referring to FIGS. 7A to 7D and 8A to 8D, the position detection sensors and the magnet may be moved from a position, in which a center of an N-pole 320a2 of the magnet 320a disposed above in the optical axis direction opposes the first position detection sensor H1 (360a) disposed below in the optical axis direction (for example, the magnet 320a is disposed in a lowermost portion, see FIG. 7A), to a position in which a center of an S-pole 320a1 of the magnet 320a disposed below in the optical axis direction opposes the second position detection sensor H2 (360b) disposed above in the optical axis direction (for example, the magnet 320a is disposed on an uppermost portion, see FIG. 7D).

As the positional relationship between the position detection sensors H1 and H2 and the magnet 320a changes from FIG. 7A (FIG. 8A) to FIG. 7D (FIG. 8D), the first and second position detection sensors H1 and H2 have a sine or cosine curve shape, as illustrated in FIG. 9. Accordingly, the position of the magnet 320a will be expressed as '0 degree' in the case in which the magnet 320a is disposed in a lowermost position (FIG. 7A) and will be expressed as '270 degrees' in the case in which the magnet 320 is gradually moved and then disposed in an uppermost portion. An actual distance from '0 degree' to '270 degrees' may be appropriately adjusted by a designer in consideration of magnetic force of the magnet and the sensing degree of the position sensor.

For example, a case of the positional relationship of FIG. 7A (FIG. 8A) is '0 degree' (leftmost), and a case of the positional relationship of FIG. 7D (FIG. 8D) is '270 degrees' (rightmost). In addition, a case of the positional relationship of FIG. 7B (FIG. 8B) is '90 degrees,' and a case of the positional relationship of FIG. 7C (FIG. 8C) is '180 degrees.'

Figure 10:
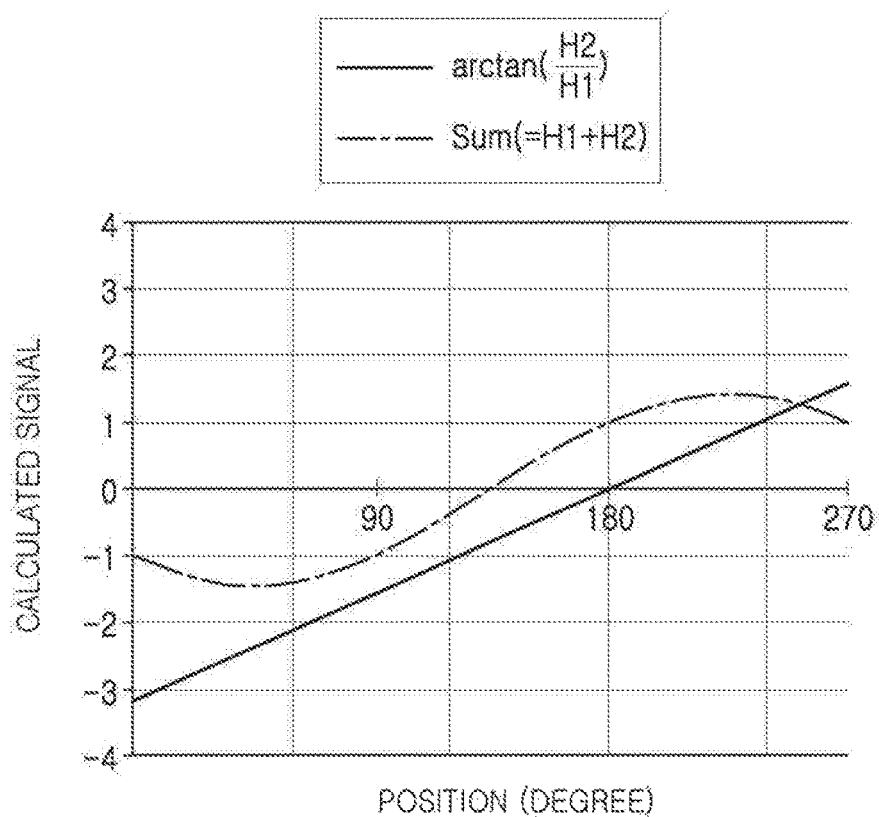
FIG. 10 is a graph illustrating the sum of the sensing values or an arctangent value of position detection sensors.

FIG. 10 is a graph illustrating the sum of the sensing values or an arctangent value of position detection sensors.

When an arctangent value of the first and second position detection sensors H1 and H2 illustrated in FIG. 9, for example, arctan(H2/H1), is taken from a sine or cosine curve value indicated by the first and second position detection sensors H1 and H2, a straight line may be derived, as illustrated in FIG. 10. For example, the arctangent value of the sensing values of the two first and second position detection sensors H1 and H2 according to this example may be used to express positions of 0 degree to 270 degrees as a gradually increased or decreased graph, in further detail, a graph constantly increased or decreased with a constant slope.

In this case, since the arctangent value may be (constantly) increased or decreased, depending on each position, a position of the movable portion 310 may be more simply and accurately sensed.

As in this example, when two position detection sensors and a magnet, polarized into an N-pole, a neutral zone, and an S-pole, are used, the second position detection sensor H1, an overlying sensor, may measure '0 degree' to '360 degrees' without difficulty. However, in the first position detection sensor H2, an underlying sensor, since a sensing value is continuously zero Tesla (T) following '270 degrees,' an increase/decrease curve having a constant slope may not be formed even when an arctangent value is applied.

Accordingly, in this example, when a movement range of the lens barrel 200 is required to be wide, the increase/decrease curve, formed from '0 degree' to '270 degrees' using the arctangent value of the sensing values of the first and second position detection sensors H1 and H2, may be extended from '270 degrees' to '360 degrees' and applied by the control portion or the sensing value of the second position detection sensor H1 may be used. As a result, a position may be accurately sensed.

Figure 11:
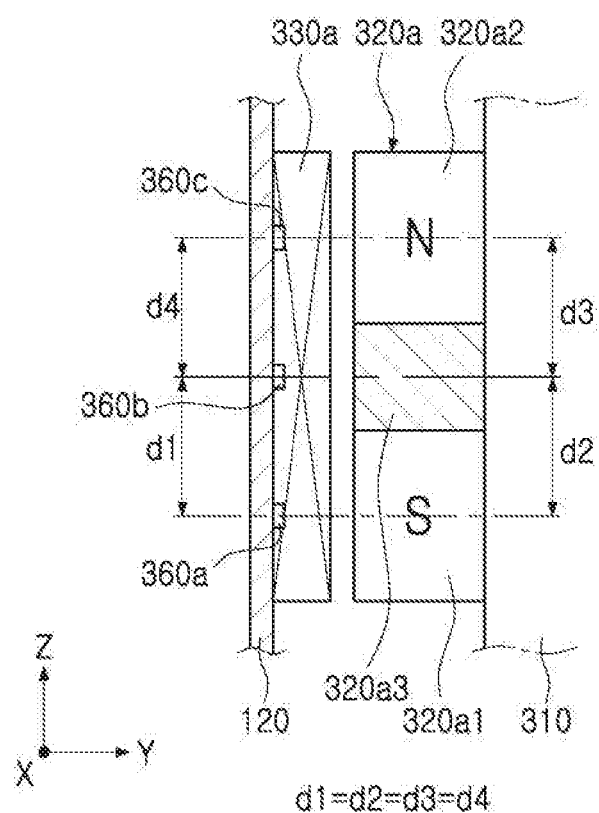
FIG. 11 is a reference diagram illustrating a positional relationship between a position detection sensor and a magnet according to another example.
Figure 12:
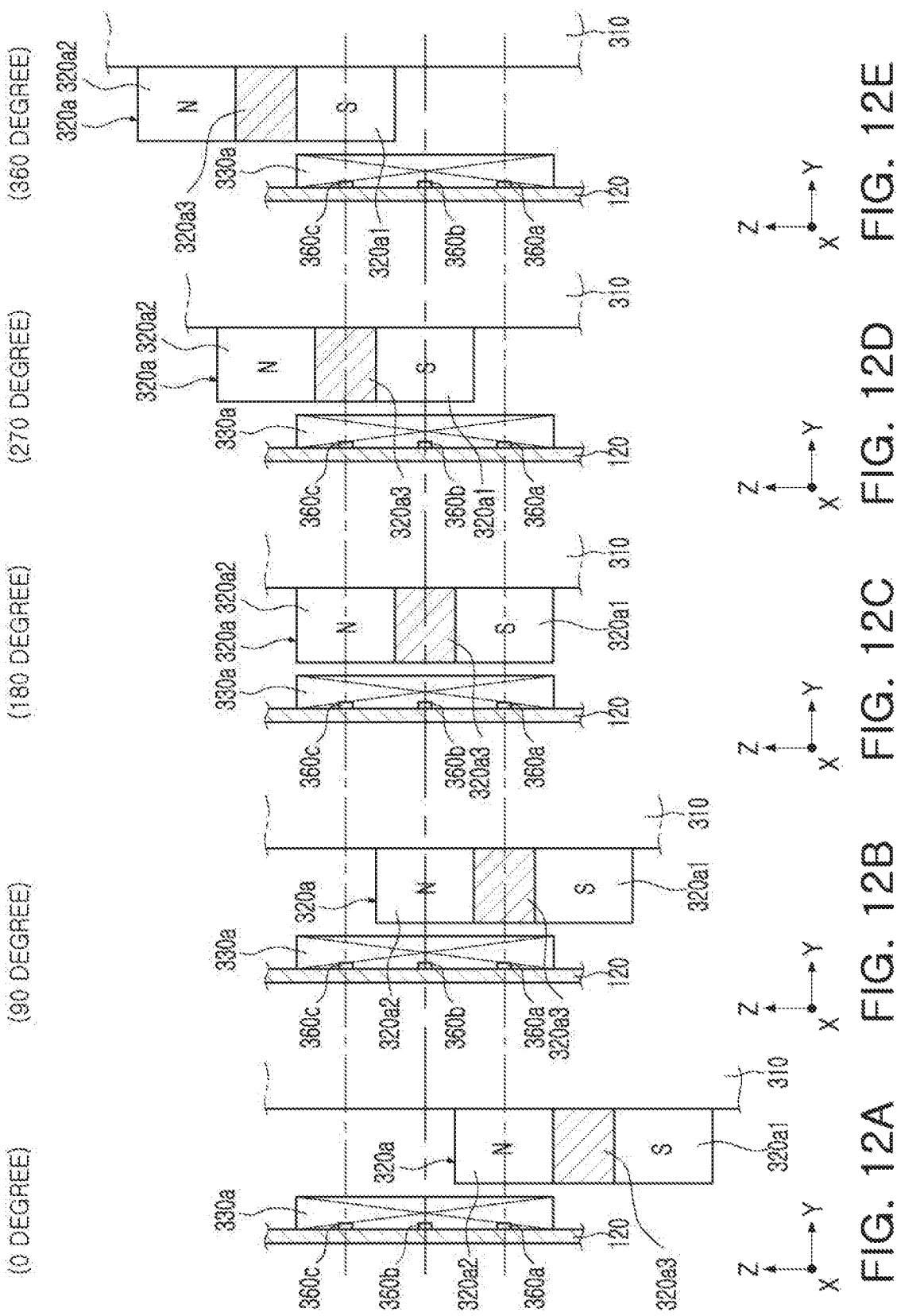
FIGS. 12A, 12B, 12C, 12D, and 12E are graphs illustrating sensing values of the position detection sensor when a movable portion is moved in an optical axis direction, in the positional relationship between the position detection sensor and the magnet illustrated in FIG. 11, respectively.

FIG. 11 is a reference diagram illustrating a positional relationship between a position detection sensor and a magnet according to another example of the present disclosure.

As described above, when two position detection sensors and a single magnet are used, it may be difficult to derive a position using an accurate arctangent value from '0 degree' to '360 degrees.' Accordingly, in this example, an additional single position detection sensor may be further provided.

In addition, an arctangent value from '270 degrees' to '360 degrees' may be accurately derived using a total of three position detection sensors H1, H2, and H3 (360a, 360b, and 360c).

Referring to FIG. 11, a camera module according to an example may include a magnet 320a in a carrier 310, a movable portion, and may include three position detection sensors 360a, 360b, and 360c in a housing 120, a fixed portion, by way of a substrate 130. In this case, the three position detection sensors 360a, 360b, and 360c may be provided. Among the three position detection sensors 360a, 360b, and 360c, a position detection sensor disposed below in the optical axis direction will be referred to as a first position detection sensor 360a, and position detection sensors disposed sequentially above the first position detection sensor 360a will be referred to as a second position detection sensor 360b and a third position detection sensor 360c.

The first to third position detection sensors 360a, 360b, and 360c may be provided in different positions in the optical axis direction. The first to third position detection sensors 360a, 360b, and 360c may be provided from a lower portion to an upper portion in the optical axis direction to have positions opposing a center of an S-pole 320a1, a center of a neutral zone 320a3, and a center of an N-pole 320a3, respectively.

A distance d1 between the centers of the first and second position detection sensors 360a and 360b in the optical axis direction may be the same as a distance d4 between the centers of the second and third position detection sensor 360b and 360c. In addition, the distance d1 between the centers of the first and second position detection sensors 360a and 360b may be (substantially) the same as a distance between the centers of the S-pole 320a1 and the neutral zone 320a3 of the magnet 320a, or a distance d3 between the centers of the N-pole 320a2 and the neutral zone 320a3 of the magnet 320a.

In this example, as described above with reference to FIGS. 6A and 6B, a position of the lens barrel 200 from '0 degree' to '270 degrees' may be sensed using an arctangent value of sensing values of the first and second position detection sensors 360a and 360b, and a position of the lens barrel 200 from '270 degrees' to '360 degrees' may be sensed using an arctangent value of sensing values of the second and third position detection sensors 360b and 360c.

Figure 13:
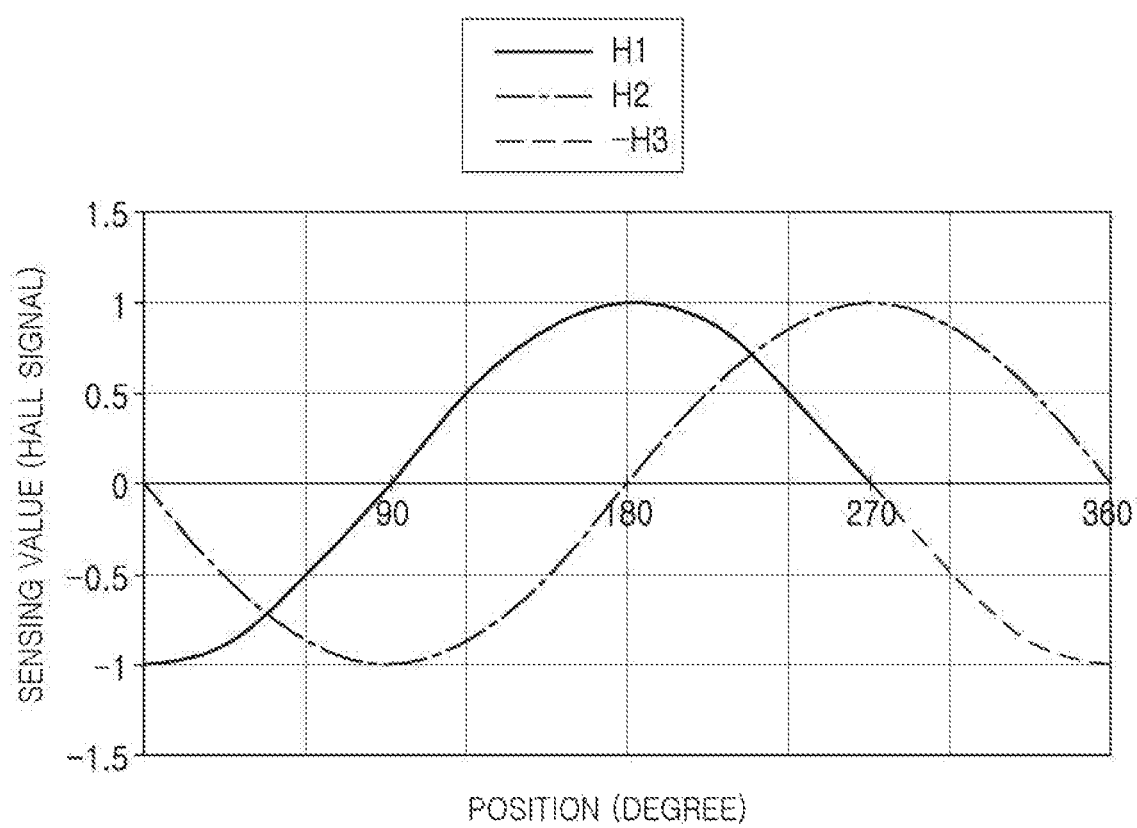
FIG. 13 is a graph illustrating sensing values of the position detection sensor when a movable portion is moved in an optical axis direction, in the positional relationship between the position detection sensor and the magnet illustrated in FIG. 11.

That is, FIGS. 12A to 12E are graphs illustrating sensing values of the position detection sensor when a movable portion is moved in an optical axis direction, in the positional relationship between the position detection sensor and the magnet illustrated in FIG. 11, respectively, and FIG. 13 is a graph illustrating the sum of the sensing values or an arctangent value of position detection sensors.

Since FIGS. 12A to 12D substantially use first and second position detection sensors H1 and H2 (360a and 360b), they may correspond to a position movement of the magnet of FIGS. 7A to 7D. However, the detection of a position movement of the magnet from FIG. 12D to FIG. 12E may be performed using the second and third position detection sensors H2 and H3 (360b and 360c).

For example, as described above, the second position detection sensor H2 may sense a position of the magnet to form an accurate sine or cosine curve from '0 degree' to '360 degrees,' and the third position detection sensor H3 may accurately measure a calculated value at '270 degrees' to '360 degrees,' a process in which an opposing region moves from a neutral zone 320a3 to an S-pole 320a1 of a magnet 320a.

However, since a sensing value of the first position detection sensor H1 and a sensing value of the third position detection sensor H3 have different signs depending on a position difference (a phase difference), a negative sign (−) may be added to the sensing value of the third position detection sensor H3 to produce the result that the sensing value of the first position detection sensor H1 and the sensing value of the third position detection sensor H3 continuously form a sine or cosine curve, as illustrated in FIG. 13.

Figure 14:
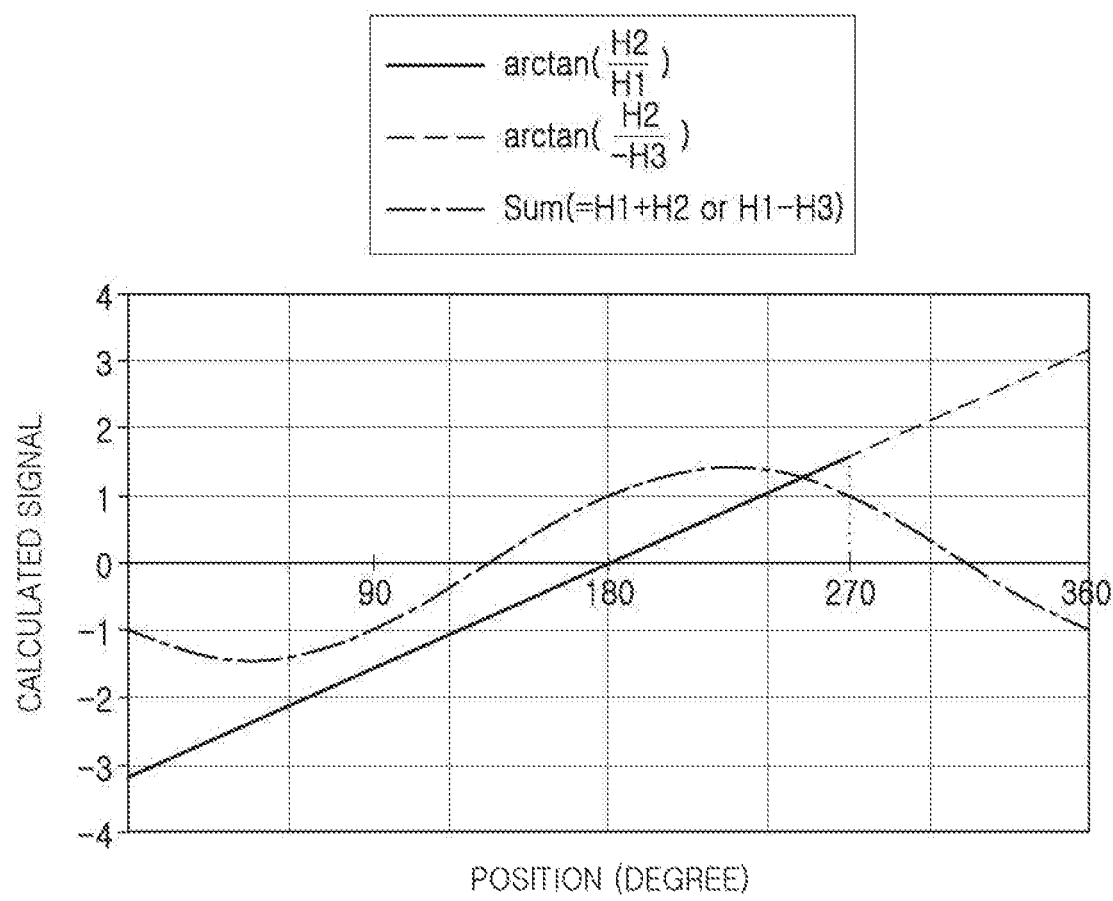
FIG. 14 is a graph illustrating the sum of the sensing values or an arctangent value of position detection sensors.

In addition, as illustrated in FIG. 14, when an arctangent value (arctan(H2/H1)) of sensing values of the first and second position detection sensors H1 and H2 is used in '0 degree' to '270 degrees' and an arctangent value (arctan(H2/(−H3))) of sensing values of the second and third position detection sensors H2 and H3 is used in '270 degrees' to '360 degrees,' an increase/decrease line straightly connected from '0 degree' to '360 degrees' may be derived. Thus, a position of a lens barrel 200 may be more accurately sensed in a wider range.

Although a detailed description is omitted, three or more position detection sensors may be used, and only two position detection sensors may sense a movement of a lens barrel in a significantly wide range by applying the spirit of the present disclosure.

According to the above-described examples, a lens driving device 300 and a camera module 1000 including the lens driving device 300 may move a lens module within a wider range to more accurately implement an autofocusing function and a zoom function.

As described above, a camera module, capable of more accurately detecting a position of a lens barrel having the large amount of movement in an optical axis direction, may be provided.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a fixed portion;
a movable portion configured to be moved relative to the fixed portion in an optical axis direction;
at least two position detection sensors including a first position detection sensor and a second position detection sensor; and
a magnet disposed to oppose the at least two position detection sensors in a direction intersecting the optical axis direction, the magnet comprising an N-pole and an S-pole on a surface opposing the at least two position detection sensors and a neutral zone between the N-pole and the S-pole, wherein
when one of the first position sensor and the second position sensor is disposed to overlap a center of the N-pole or the S-pole in the direction intersecting the optical axis direction, the other of the first position sensor and the second position is disposed to overlap a center of the neutral zone in the direction intersecting the optical axis direction.

2. The camera module of claim 1, wherein the distance between the center of the first position detection sensor and the center of the second position detection sensor in the optical axis direction is substantially the same as a distance between the center of the N-pole or the S-pole of the magnet and the center of the neutral zone of the magnet.

3. The camera module of claim 1, wherein sensing values of the first position detection sensor and the second position detection sensor have a sine or cosine curve when the movable portion is moved in the optical axis direction.

4. The camera module of claim 3, wherein the sensing values of the first position detection sensor and the second position detection sensor have a phase difference of about 90 degrees when the movable portion is moved in the optical axis direction.

5. The camera module of claim 1, wherein a value of arctan(H2/H1) is increased or decreased in at least one period of a moving range of the movable portion, where H1 and H2 are sensing values of the first position detection sensor and the second position detection sensor, respectively.

6. The camera module of claim 5, wherein the value of arctan(H2/H1) is constantly increased or decreased in the at least one period of the moving range of the movable portion.

7. The camera module of claim 1, wherein a distance from the center of the neutral zone of the magnet to the center of the N-pole of the magnet in the optical axis direction and a distance from the center of the neutral zone of the magnet to the center of the S-pole of the magnet in the optical axis direction are substantially the same.

8. The camera module of claim 1, wherein a length of the N-pole of the magnet in the optical axis direction and a length of the S-pole of the magnet in the optical axis direction are the same.

9. The camera module of claim 1, wherein the first position detection sensor and the second position detection sensor are disposed adjacent to each other, and
one of the first and second position detection sensors is disposed in substantially a same position as a center of a coil in the optical axis direction.

10. The camera module of claim 9, wherein the other of the first and second position detection sensors is spaced apart from a portion above or below the center of the coil at a certain interval in the optical axis direction.

11. The camera module of claim 1, wherein the first position detection sensor and the second position detection sensor disposed adjacent to a coil, and the magnet is disposed to oppose the coil in the direction intersecting the optical axis direction.

12. The camera module of claim 1, wherein only one of the at least two position detection sensors opposes one of the N-pole and the S-pole when the movable portion is moved in the optical axis direction.

13. The camera module of claim 12, wherein only one of the at least two position detection sensors opposes one of the N-pole and the S-pole when the movable portion is disposed in an uppermost or lowermost portion in the optical axis direction.

14. The camera module of claim 1, wherein the N-pole or the S-pole, not opposing the position detection sensor, opposes air when each of the at least one position detection sensor and the at least one other position detection sensor are disposed in a position opposing both the center of one of the N-pole and the S-pole and the center of the neutral zone.

15. The camera module of claim 1, wherein the magnet is disposed on the movable portion and the at least two position detection sensors are disposed on the fixed portion.

16. The camera module of claim 1, wherein the magnet is disposed on the fixed portion and the at least two position detection sensors are disposed on the movable portion.

17. A camera module comprising:
a housing; and
a movable portion configured to be moved relatively to the housing in an optical axis direction, wherein one of the housing and the movable portion comprises a coil and the other of the housing and the movable portion comprises a magnet that opposes the coil in a direction intersecting the optical axis direction,
the magnet comprises an N-pole and an S-pole on a surface opposing the coil in the optical axis direction and a neutral zone between the N-pole and the S-pole,
at least two position detection sensors are disposed in different positions in the optical axis direction to oppose the magnet, and
a distance between centers of two adjacent position detection sensors, among the at least two position detection sensors, is substantially the same as a distance between a center of the N-pole or the S-pole of the magnet and a center of the neutral zone of the magnet.

18. The camera module of claim 17, wherein the at least two position detection sensors include at least three position sensors arranged side by side along the optical axis direction and the at least three position sensors are disposed to have a same interval in the optical axis direction.

19. A camera module comprising:
a fixed portion;
a movable portion configured to be moved relative to the fixed portion in an optical axis direction;
a first position detection sensor;
a second position detection sensor spaced apart from the first sensor along the optical axis direction; and
a magnet disposed to oppose the first and second position detection sensors along a direction intersecting the optical axis direction, the magnet comprising an N-pole and an S-pole that oppose each other along the optical axis direction with a neutral zone disposed therebetween,
wherein when one of the first position sensor and the second position sensor is disposed to overlap a center of the N-pole or the S-pole in the direction intersecting the optical axis direction, the other of the first position sensor and the second position sensor is disposed to overlap a center of the neutral zone in the direction intersecting the optical axis direction.

20. The camera module of claim 19, further comprising a coil configured to electromagnetically interact with the magnet to move the movable portion relative to the fixed portion in an optical axis direction, wherein
the coil and the first and second position detection sensors are disposed together on one of the movable portion and the fixed portion, and the magnet is disposed on the other one of the movable portion and the fixed portion.

* * * * *